Patented Oct. 16, 1945

2,387,056

UNITED STATES PATENT OFFICE 2,387,056

SURFACE PLATE COATINGS

Arthur W. Buck and Joseph W. Miller, St. Louis, Mo., assignors to Buck X-Ograph Company, St. Louis, Mo., a corporation of Missouri No Drawing. Application April 12, 1943, Serial No. 482,824

2 Claims. (Cl. 95—7)

This invention relates to a dichromate surface plate coating for use in the lithographic printing press, and it is a particular object of the invention to provide a solution of this kind which eliminates the use of egg albumen.

The lithographic industry has long felt the need of a surface plate coating which possesses the working qualities of egg albumen but without its undesirable features. It is known that even the finer grades of egg albumen are not uniform and are readily affected by atmospheric conditions.

The present invention has for an object to provide a coating eliminating the use of albumen and which assures long and uniform press runs and also rendering high negative values, smoother tints and finer detail than ordinarily obtained by use of egg albumen.

It is also an object of the invention to provide a dichromate surface plate coating solution by dissolving into a single solution a correctly proportioned combination of casein and gelatin, plus an alkali, to which solution a proper amount of ammonium dichromate is added.

The use of dichromated gelatin has long been known to the industry but its water absorption characteristic in connection with its excessive ink absorption, noticeably reduces its sharpness of image and wearing quality which renders it less desirable than egg albumen. Dichromated casein and also dichromated glue have been used to a considerable extent, but while glue has the same shortcomings as gelatin, casein is too hard and inclined to break, chip or peel and also lacks the flowability necessary to the uniform coating of metallic plates. It is a purpose of the invention to provide a coating free of these objectionable features.

The present invention comprises a solution including:

| | Parts |
|---|---|
| Casein | 12 |
| Gelatin | 5 |
| Alkali (borax) | 1 |

While particular reference is made to borax, it is stated that other alkali in varying amounts will produce satisfactory results.

The relative amounts of casein and gelatin hereinbefore mentioned have been found to produce desirable results but we do not wish to be limited to this exact proportion as an increase or decrease of the amounts hereinbefore stated might be used with varying success under certain conditions. However, the use of less than four parts of gelatin to twelve parts of casein has been found to produce a coating which is too hard and lacking in flowability while more than six parts of gelatin to twelve parts of casein have been found to be too soft and water absorbent.

In preparing the solution, the casein, gelatin and alkali, which is in powdered form, are added to the usual sensitizer, such as now employed in egg albumen, and which usually consists of water 32 oz. and ammonium dichromate approximately 1½ oz.

The coating or solution as embodied in the present invention is applied in accordance with the method now well known to the industry and is the same in principle as that now employed with the use of egg albumen.

What is claimed is:

1. A solution for coating a printing plate comprising, a sensitizer, casein approximately 12 parts, gelatin from 4 to 6 parts, and borax approximately 1 part.

2. A composition for addition to a sensitizer solution for use as a printing plate coating, consisting of casein approximately 12 parts, gelatin from 4 to 6 parts, and borax 1 part.

ARTHUR W. BUCK.
JOSEPH W. MILLER.